(12) United States Patent
Bourdon et al.

(10) Patent No.: US 9,376,034 B2
(45) Date of Patent: Jun. 28, 2016

(54) METHOD FOR MINIMIZING THE ELECTRICITY CONSUMPTION REQUIRED FOR A PUBLIC TRANSPORT NETWORK AND ASSOCIATED ALGORITHMIC PLATFORM

(71) Applicant: SIEMENS S.A.S., St. Denis (FR)

(72) Inventors: David Bourdon, Marcq en Baroeul (FR); Nicolas Chanclou, Paimpont (FR); Nicolas Urien, Paris (FR)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/409,637

(22) PCT Filed: Jul. 8, 2014

(86) PCT No.: PCT/EP2014/064544
§ 371 (c)(1),
(2) Date: Dec. 19, 2014

(87) PCT Pub. No.: WO2015/022118
PCT Pub. Date: Feb. 19, 2015

(65) Prior Publication Data
US 2015/0251565 A1 Sep. 10, 2015

(30) Foreign Application Priority Data
Aug. 14, 2013 (EP) ..................................... 13290191

(51) Int. Cl.
*G05D 1/00* (2006.01)
*G05D 3/00* (2006.01)
(Continued)

(52) U.S. Cl.
CPC . *B60M 3/06* (2013.01); *B60M 3/00* (2013.01); *G08G 1/123* (2013.01)

(58) Field of Classification Search
CPC .............. G08G 9/00; G08G 1/096816; G08G 1/096758; G08G 1/096708; G08G 1/096741; G08G 1/66; G08G 1/096775; B60L 2230/12; B60L 3/0015; B60L 3/0053; B60L 3/0038; B60L 3/04; B60L 7/20; B60L 7/18; B60L 7/02; B60L 2240/525; B60L 11/1811; B60L 11/1809; B60L 2220/44; B60L 15/2045; B60M 1/36; B60M 3/06; B60M 3/00; B60M 7/003

USPC ......... 701/19, 22, 70, 1, 113, 2, 123, 532, 93, 701/99, 71, 78, 90, 96, 20, 301; 318/376

See application file for complete search history.

(56) References Cited

U.S. PATENT DOCUMENTS 5,331,261 A * 7/1994 Brown ....................... B60L 7/22
246/182 A
5,346,163 A 9/1994 Momma et al.
(Continued)

FOREIGN PATENT DOCUMENTS

DE 19652407 C1 6/1998
EP 0997340 A1 5/2000
(Continued)

*Primary Examiner* — Calvin Cheung
*Assistant Examiner* — Luis A Martinez Borrero
(74) *Attorney, Agent, or Firm* — Laurence Greenberg; Werner Stemer; Ralph Locher

(57) ABSTRACT

A method for minimizing the electricity consumption required for a public transport network that includes several consumers such as electric vehicles. When the vehicles brake, they deliver energy which is recoverable by consumers on the network, such as moving vehicles. A timetable of running orders for all the vehicles is produced, taking account of at least the following parameters: a dynamic location of each vehicle, a stop schedule for each vehicle outside a stop zone, a start schedule for each vehicle in a stop zone in the network; depending on time and motion variations in at least one of said parameters, at least some of the running orders in the timetable are modified chronologically according to a criterion for the maximum distribution of energy recovered from braking to consumers potentially actively requiring power. The timetable is delivered to the vehicles. An associated algorithmic platform may implement the novel process.

13 Claims, 2 Drawing Sheets

(51) Int. Cl.
  *G06F 7/00* (2006.01)
  *G06F 17/00* (2006.01)
  *B60M 3/06* (2006.01)
  *B60M 3/00* (2006.01)
  *G08G 1/123* (2006.01)

(56) References Cited

U.S. PATENT DOCUMENTS

| | | | | |
|---|---|---|---|---|
| 7,362,065 B2* | 4/2008 | Takano | B60L 7/006 | 318/139 |
| 7,482,767 B2* | 1/2009 | Tether | B60L 7/10 | 318/139 |
| 7,618,011 B2* | 11/2009 | Oleski | B61L 25/025 | 246/1 C |
| 7,734,383 B2* | 6/2010 | Philp | B61L 27/0027 | 246/2 R |
| 7,797,088 B2* | 9/2010 | Philp | B61L 27/0027 | 104/137 |
| 7,937,193 B2* | 5/2011 | Philp | B61L 27/0011 | 246/2 R |
| 7,940,016 B2* | 5/2011 | Donnelly | B60L 7/04 | 318/139 |
| 8,040,084 B2* | 10/2011 | Muta | B60K 6/445 | 318/375 |
| 8,483,895 B1* | 7/2013 | Beregi | B61B 1/00 | 246/182 C |
| 8,494,694 B2* | 7/2013 | Dueck | B61B 1/00 | 104/112 |
| 8,615,350 B2* | 12/2013 | Goto | B60T 1/10 | 116/28 R |
| 8,643,316 B2* | 2/2014 | Kono | B60L 3/0023 | 318/139 |
| 8,655,518 B2* | 2/2014 | Cooper | B61L 3/006 | 340/994 |
| 8,670,890 B2* | 3/2014 | Fournier | G06Q 10/04 | 701/20 |
| 8,674,541 B2* | 3/2014 | Peitzke | B60L 9/00 | 307/9.1 |
| 8,682,511 B2* | 3/2014 | Andreasson | B60L 9/00 | 104/19 |
| 8,831,801 B1* | 9/2014 | Raghunathan | G06F 17/11 | 700/291 |
| 9,026,268 B2* | 5/2015 | Kumar | B61C 17/12 | 267/220 |
| 9,037,388 B2* | 5/2015 | McCrary | B60C 7/00 | 701/117 |
| 9,108,652 B2* | 8/2015 | Fournier | B61L 27/0027 | |
| 9,126,608 B2* | 9/2015 | Kapp | B61L 3/006 | |
| 9,221,476 B2* | 12/2015 | Breuer | B60T 8/1705 | |
| 2004/0207350 A1* | 10/2004 | Wilton | B60L 3/0046 | 318/376 |
| 2004/0263099 A1* | 12/2004 | Maslov | B60L 11/126 | 318/400.24 |
| 2006/0005738 A1* | 1/2006 | Kumar | B60L 7/06 | 105/35 |
| 2006/0076171 A1* | 4/2006 | Donnelly | B60L 7/04 | 180/65.225 |
| 2008/0109124 A1* | 5/2008 | Daum | B61L 27/0016 | 701/19 |
| 2009/0099825 A1* | 4/2009 | Bollapragada | B61L 27/0016 | 703/8 |
| 2009/0118970 A1* | 5/2009 | Daum | B61L 3/006 | 701/102 |
| 2010/0019726 A1* | 1/2010 | Kumar | B60L 3/0046 | 320/125 |
| 2010/0023190 A1* | 1/2010 | Kumar | B61L 3/006 | 701/20 |
| 2010/0153419 A1* | 6/2010 | Daum | G06F 17/30575 | 707/758 |
| 2010/0163687 A1* | 7/2010 | Brand | B61L 3/127 | 246/117 |
| 2010/0241295 A1* | 9/2010 | Cooper | B60T 13/665 | 701/19 |
| 2011/0060486 A1* | 3/2011 | Meltser | B61C 17/12 | 701/19 |
| 2011/0316333 A1* | 12/2011 | Still | B61L 1/003 | 307/9.1 |
| 2013/0144466 A1* | 6/2013 | Cooper | B61L 3/006 | 701/2 |
| 2013/0204443 A1* | 8/2013 | Steven | G06Q 10/00 | 700/286 |
| 2014/0012454 A1* | 1/2014 | Fournier | G06Q 10/04 | 701/23 |
| 2014/0058570 A1* | 2/2014 | Kumar | B61C 15/00 | 700/283 |
| 2014/0180510 A1* | 6/2014 | Fournier | B61L 27/0027 | 701/20 |
| 2014/0277861 A1* | 9/2014 | Raghunathan | B61L 99/00 | 701/19 |
| 2014/0304025 A1* | 10/2014 | Steven | G06Q 10/06314 | 705/7.24 |
| 2014/0330460 A1* | 11/2014 | Schoonmaker | B61C 17/12 | 701/19 |
| 2014/0379180 A1* | 12/2014 | Kral | B61C 7/04 | 701/19 |
| 2015/0097423 A1* | 4/2015 | Chattot | H02J 3/008 | 307/9.1 |

FOREIGN PATENT DOCUMENTS

| | | |
|---|---|---|
| EP | 2505416 A1 | 10/2012 |
| JP | H05176457 A | 7/1993 |
| WO | 2013099171 A1 | 7/2013 |

* cited by examiner

METHOD FOR MINIMIZING THE ELECTRICITY CONSUMPTION REQUIRED FOR A PUBLIC TRANSPORT NETWORK AND ASSOCIATED ALGORITHMIC PLATFORM

BACKGROUND OF THE INVENTION

Field of the Invention

The present invention relates to a method for minimizing the electricity consumption required for a public transport network and an associated algorithmic platform. The public transport network has several consumers, such as electric vehicles, and the vehicles, when braking, deliver energy which is recoverable by consumers on the network such as moving vehicles.

The increasing urbanization of the world population requires cities and transport to be restructured. It is estimated that the proportion of city-dwellers in the world will be 70% in 2050. The major challenge of this development is to respond to the indispensable need for mobility of men and goods. In fact, the current great economic trends, marked by the globalization of markets and the acceleration of trade, involve a strengthening and reorganization of the entire transport offer. The explosion in this mobility causes great environmental and health nuisances. Faced with the risk of global warming and climate change, European governments therefore have the ambition of reducing greenhouse gas emissions by a factor of 4 by 2050.

In order to respond to these two contradictory objectives, namely improving the quality of the transport offer and reducing greenhouse gas emissions, not to mention anticipating the exhaustion of fossil resources, great efforts are to be made with regard to energy systems and the global organization of the transport offer. For several years, there has been in this respect a redevelopment of cities by reintroducing electric public transport such as trams, metros or even electric buses. Such transport facilitates urban mobility and generally operates on electrical energy, making it less pollutant than private cars or traditional buses.

Although (electric) rail transport is still one of the less pollutant sectors, the cost of energy in the operation of transport systems, in particular urban systems, is significant and this results in a need to improve the global productivity of said systems. The idea of sustainable mobility and global optimization of energy, from a system point of view, remains one of the challenges for tomorrow.

In this context, numerous studies are today looking at the introduction of energy storage at stations or on board. Some applications have shown, however, that it is already possible, without adding storage equipment, to obtain significant (electric) energy savings through optimization of energy recovery between trains present on a transport system line. In fact, in electric rail traction, train motors consume current in order to run and produce it when braking, the motors then being transformed into generators.

An excellent known example of such a method for minimizing electricity consumption through energy recovery is well described by patent DE 196 52407 C1, in particular by its FIGS. 1, 2a and 2b and their descriptive parts, in that energy is released by braking one of the public transport vehicles and then recovered by another of the moving vehicles in said transport system. In principle, when a sub-station on the ground in the transport system detects an energy inflow (originating from a vehicle braking), it sends a radio signal to other moving vehicles located in its radio coverage zone in order to instruct them, if possible (i.e. if vehicles are at least within radio coverage) immediately to use the available energy inflow instead of consuming or in order at least to minimize their paid energy consumption from a transport system power supply network. The implementation of the method described by DE 196 52407 C1 also seems limited, since orders are addressed to vehicles which do not have sufficient margin for immediate energy usage or recovery, implying adaptation of their motion (speed, acceleration) either when they are already moving at a maximum authorized speed (and are incapable of recovering more energy) or because they have to undergo compulsory braking before entering a station (and are forced to lose surplus energy).

Today, the electricity produced during braking is not normally stored (or only at great cost) and therefore has to be consumed by vehicles such as running trains. If the production of electricity (by recovery) exceeds the demand, the kinetic energy recoverable during braking is thus lost and dissipated. In this case, the brakes heat up and wear. So, at any given moment, trains are starting, braking, running or at rest and the electricity production and consumption phases are continually alternating. There are then two situations:
- too many trains are in start-up phase and the power required is too great,
- too many trains are braking at the same moment and not all the kinetic energy can be completely recovered by other vehicles at lower cost (without any means of storage).

BRIEF SUMMARY OF THE INVENTION

An object of the present invention is to propose a method for minimizing the electricity consumption required (in terms, for example, of minimizing the "required power") for a public transport network comprising several consumers such as electric vehicles, said vehicles, when braking, delivering energy which can be recovered by consumers on the network such as moving vehicles, and for which two situations involving over-consumption of said "required power" for the network are then to be avoided:
- too many trains are in start-up phase and the power required is too great to be compensated by an inflow of power recovered by too small braking energy,
- too many trains are braking at the same moment and the kinetic energy is not recoverable so as to be effectively redistributed (in terms of power output—i.e. instantaneously usable—for a "consumer" vehicle).

In addition, an object of the present invention is to propose an algorithmic platform able to implement the above-mentioned method and capable of being simply implemented for the execution of a running order in a transport network. This platform should be sufficiently dynamic to provide for the implementation of the algorithm for the above-mentioned method periodically (for example daily) or instantaneously.

The method and the algorithmic platform according to the invention should be robust in order to counter disturbances and unforeseen events with respect to the traffic in the transport network, to the effect that the variable density and frequency of daily traffic are maintained at a restricted level not penalizing a transport network user.

A solution is thus proposed according to a method for minimizing the electricity consumption required for a public transport system network and associated algorithmic platform as claimed.

On the basis of a method for minimizing the electricity consumption required for a public transport system network comprising several consumers such as electric vehicles (trams, trolleybuses, metros, trains, etc.), said vehicles, when braking, delivering energy which is recoverable by consumers on the network such as moving vehicles, said method according to the invention is characterized in that: a timetable of running order(s) for all the vehicles is produced taking account of at least the following parameters: a dynamic location of each vehicle, a stop schedule for each vehicle outside a stop zone, a start schedule for each vehicle in a stop zone in the transport network;

depending on time and motion variations in at least one of said parameters, at least some of the running orders in the timetable are modified chronologically according to at least one criterion for the maximum distribution of energy recovered from braking to consumers potentially actively requiring power; the timetable comprising the orders is delivered to the vehicles.

In fact, the mere knowledge of the above-mentioned parameters makes it possible advantageously to determine instantaneous and advance kinetics (over at least a short term—a few seconds—or a long term such as a day) for all the vehicles and thus also to adapt instantaneously or in advance "model running orders" for each of the vehicles so that, depending on their respective positions in the network, their running phases requiring or providing energy are intelligently correlated (for example through the introduction of perceptible time delay of a running order for a start of a first vehicle with respect to a second vehicle located downstream of the first vehicle and not yet having begun its braking phase prior to a planned stop within a fixed schedule) in order to avoid the problems mentioned above as part of the invention. In other words, pluralities of running orders are periodically modified to adapt the position and motion of neighboring vehicles so as to be able to correlate, i.e. match their energy requirements and contributions, which are mutually transferable within one of the time and space criteria for optimum running. Knowing that said modifications to running orders are frequent, they only involve decelerations, accelerations or prolonged stops for some vehicles within small time lapses (for example 10 s), thus hardly disturbing the users/passengers on the public transport network/system.

In particular in the case of an automatic transport system (such as a driverless metro line or public transport lines including location beacons along their route), and owing to the direct and dynamic knowledge of the vehicles, the method according to the invention can easily be implemented.

The implementation of the method according to the invention, unlike the teaching of DE 196 52407 C1 is also advantageously possible when the vehicle running orders have acceptable variation margins for immediate usage or quasi-immediate predictive recovery of energy involving adapting their motion in the sense of adjusting a start schedule, stop schedule, etc.

A set of sub-claims also presents advantages of the invention.

The method according to the invention provides that the timetable of running orders for all the vehicles can finally be produced taking account of at least one of the following additional parameters: a number of vehicles braking, a number of consumers, an instantaneous speed of each vehicle, as well as any other parameter associated with a safe or even degraded moving vehicle operating mode. A priori, these additional parameters may ideally stem from the above-mentioned location in safe, "non-degraded" mode of the traffic in the network but, if an alert signal indicates a degraded mode for at least one vehicle, the method according to the invention again presents the advantage of being robust for all the other vehicles in the network, since it also makes it possible, for example, not to impose on a vehicle in degraded mode, e.g. by a lack of energy, to compensate a requirement of another vehicle needing energy. The method according to the invention provides that the orders in the timetable are distributed either by storing said table, or its orders, in an onboard vehicle running control module or in real time by transmission of the table, or its instantaneously modifiable orders, to all the vehicles. In this way, even if the number of vehicles in the network increases (peak phase), their running orders can still be modified autonomously according to the pattern presented above.

The method according to the invention provides that the variable or modifiable running orders comprise at least one of the following orders: prolonged stop; premature stop; premature start; reduced speed; accelerated speed; acceleration or deceleration interval. In this way, since these variations are still always updated frequently within small intervals, they tend to be quasi-continuous and within low amplitudes, so as not to disturb the global traffic of several neighboring vehicles (which are able to exchange energy according to the method). In particular, variable running orders such as "prolonged stop" or "premature start" are variable within a reasonable maximum interval so as not to disturb an imposed minimum traffic frequency, for example within a maximum prolonged stop interval of 10 s.

The method according to the invention provides that, in the event of variation of the global number of vehicles or the frequency of the transport network, the timetable is updated in real time, either within a predefined pattern depending on at least one type of disturbance, or within a dynamic pattern of orders modified and instantaneously distributed to the vehicles. Here too, the method brings great flexibility matched to the more or less predictive and dynamic nature of a network. In particular, during modifications, extensions or interruptions to parts of the network, the method according to the invention provides for autonomous energy management within a form laid down in a precise or lesser manner. It is therefore no longer necessary for a transport network manager to undertake highly complex energy planning devoted to patterns of disturbances whose untimely nature may result in a lengthy blockage of the traffic.

The method according to the invention finally provides that variable running orders also depend on line profile factors such as inclines, viaducts, etc. and load factors such as a number of passengers on the transport network. Hence, the method according to the invention is appropriately matched to external network factors which affect its energy needs with a view to modifying the vehicle running orders.

It also advantageously proposes an algorithmic platform to implement the method according to the invention, having a memory support to store the timetable, said timetable comprising at least one running order of one or more vehicles, said running order being able to be executed instantaneously by each of said vehicles in the transport network. In this way, running orders for each vehicle can be modified according to the invention more autonomously or between the vehicles themselves (through the transmission of inter-vehicle data using "Hop-by-Hop" exchanges as for a carrousel network configuration where cycles of modifications of running orders are sequentially imposed over the entire length of the carrousel) and within a secure communication protocol matched to the current public transport requirements.

Also, the algorithmic platform according to the invention can include centrally at least one part of memory support in a central control position for global traffic on the transport network, said part being interconnectable with vehicle running order execution modules. This algorithmic configuration with more central data distribution may be advantageous if a network manager wishes to implement the method according to the invention on the basis of his existing network including central running order commands. This algorithmic platform is rapid and simple to install, since it only requires updating of a central network and vehicle control and command algorithm.

Finally, the algorithmic platform according to the invention can include at least one part of memory support on board a vehicle linked to a vehicle running order execution module. This relocation of vehicle control and command into the vehicle itself makes the implementation of the method according to the invention more flexible, since it can be more autonomous, in particular in expectation of providing for inter-vehicle communication in order to modify running orders locally in the network with no heavier communication structure via a central position.

The algorithmic platform according to the invention provides that the vehicle running order execution module executes a vehicle running program respecting a minimum electricity consumption constraint. Other constraints may also be imposed in order to be able to prevent running order modifications remaining in a restricted amplitude range, thus only involving quasi-continuous traffic (running) variations, the average of the variations of which respects target timetables, the latter being understandable to guarantee satisfaction of the daily traffic both for the manager and for the users/passengers of the public transport network.

BRIEF DESCRIPTION OF THE SEVERAL VIEWS OF THE DRAWING

Exemplary embodiments and applications are provided using described figures.

DESCRIPTION OF THE INVENTION

Figure 1:
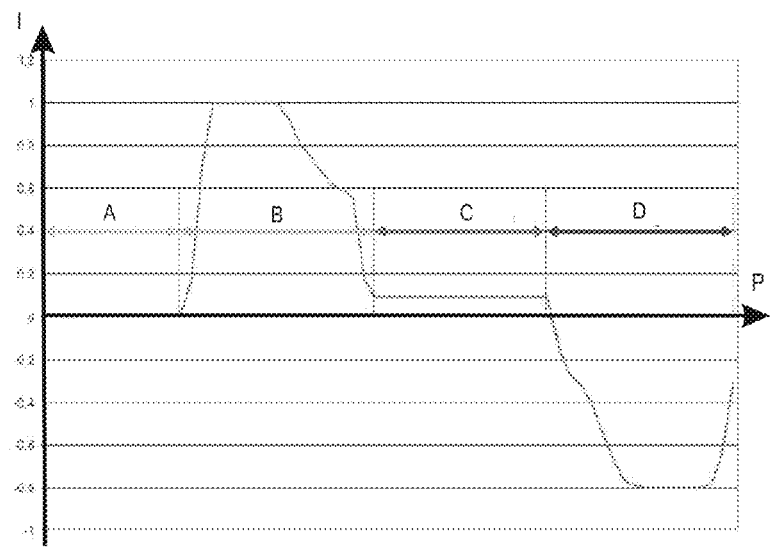
FIG. 1 Model energy profile depending on the running order of a vehicle.

FIG. 1 presents a model energy profile I according to the route P under a vehicle running order in a known transport system between two stop stations. The consumption or potential inflow of energy is thus represented in four successive phases A, B, C, D:

in phase A, the vehicle is stopped in a station and therefore is in principle consuming no energy, at least any required for it to move;

in phase B, the vehicle is leaving the station and presents a traction energy consumption required to accelerate up to an approved speed;

in phase C, the vehicle is running along its route at a quasi-constant speed in the form of a speed plateau;

in phase D, the vehicle is approaching another stop station and starting to brake, during which an inflow of energy from said vehicle by braking energy recovery is possible.

Figure 2:
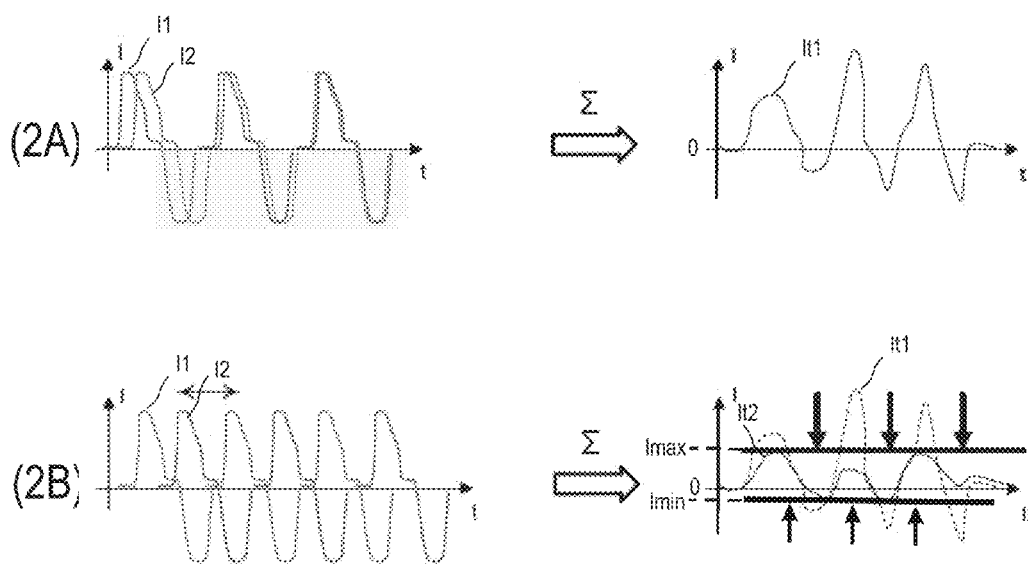
FIG. 2 Energy profiles without (2A) and with (2B) implementation of the method according to the invention by modifying at least one of the running orders of two vehicles, FIG. 3 Implementation of the method according to the invention by cyclic modification of vehicle running orders on a carrousel type route.

FIG. 2A presents, in a first graph, first and second energy profiles I1, I2 according to FIG. 1 respectively of a first and a second vehicle which may for example be moving in opposite directions on two tracks positioned between two stop stations. The crossing vehicles are then sufficiently close to permit an exchange of energy such as at least described in the prior art DE 196 52407 C1. More exactly, FIG. 2A comprises vehicle energy profiles as a function of time t crossing between first, second, third and fourth stations. Between the first and second stations, the second vehicle starts from the second station with a delay with respect to the first vehicle, which has already started from the first station. Of course, an exchange of energy is found to be possible between the two vehicles since one of them may present a consumer phase during which a supply phase by current recovery from the other vehicle will be possible. Thus, globally on a second graph, a total energy profile It1 of the transport system between the four stations can be deduced by algebraic addition of profiles I1, I2 of each vehicle (in fact, all the vehicles crossing on the route between the four stations). Even though the total energy profile It1 of course presents attenuated peaks of power requirement (It1>0), since consumer and energy recovery phases are coupled between vehicles, said consumption peaks are not quantitatively controllable below a desired level owing to unforeseen traffic events, route conditions, the number of passengers, etc. Furthermore, the total energy profile It1 also presents potential recovery phases of energy (It1<0) which is eventually no longer being actively recovered according to a controlled optimum and thus forms unavoidable losses and/or superfluous heating of the brakes.

FIG. 2B presents, on the same model as FIG. 2A, energy profiles I1, I2, It1 on two graphs, but implementing the method according to the invention. In other words, and in order to simplify the example given, the running order of the first and/or second vehicle is going to be modified, in that:

a timetable of running orders for all the vehicles is produced taking account of at least the following parameters: a dynamic location of each vehicle, a stop schedule for each vehicle outside a stop zone, a start schedule for each vehicle in a stop zone in the transport network;

depending on time and motion variations in at least one of said parameters, at least some of the running orders in the timetable are modified chronologically according to at least one criterion for the maximum distribution of energy recovered from braking to consumers potentially actively requiring power;

the timetable comprising the orders is delivered to the vehicles.

In the case of FIG. 2B, first graph, the second vehicle corresponding to the second profile I2, which is stopped and has a start schedule delayed with respect to the start of the first vehicle, which is moving, will thus be chosen (at least between the first two stations) to start with at least a perceptibly accentuated delay so as to make at least its start phase (phase B, FIG. 1) coincide with the energy recovery phase (phase D, FIG. 1) of the first vehicle. On the second graph in FIG. 2B, two advantages are thus visible:

a total energy profile It2 on FIG. 2B presents a controlled energy consumption maximum Imax, this being considerably less than the peaks of the total energy profile It1 according to FIG. 2A;

the total energy profile It2 on FIG. 2B presents a controlled energy recovery minimum Imin, this (in absolute value) being considerably less than the peaks of the total energy profile It1 according to FIG. 2A.

This very simple example of running order modification according to FIG. 2A is thus a priori possible thanks simply to a knowledge of the location of vehicles whose proximity permits an exchange of energy. Knowledge of the stop and start schedules for such vehicles is however useful in order to modify the running orders according to criteria not penalizing the transport network and system user/passenger. Furthermore, since the method according to the invention provides for dynamic modifications to target running orders, having knowledge of the motion of each vehicle, it also provides for autonomous modification of said orders or their parameters in accordance with inopportune features (case of a degraded vehicle mode) or during a change in traffic density (transition between off-peak and peak hours). This advantage of great flexibility is considerable both for a transport network/system manager and for the users/passengers.

Figure 3:
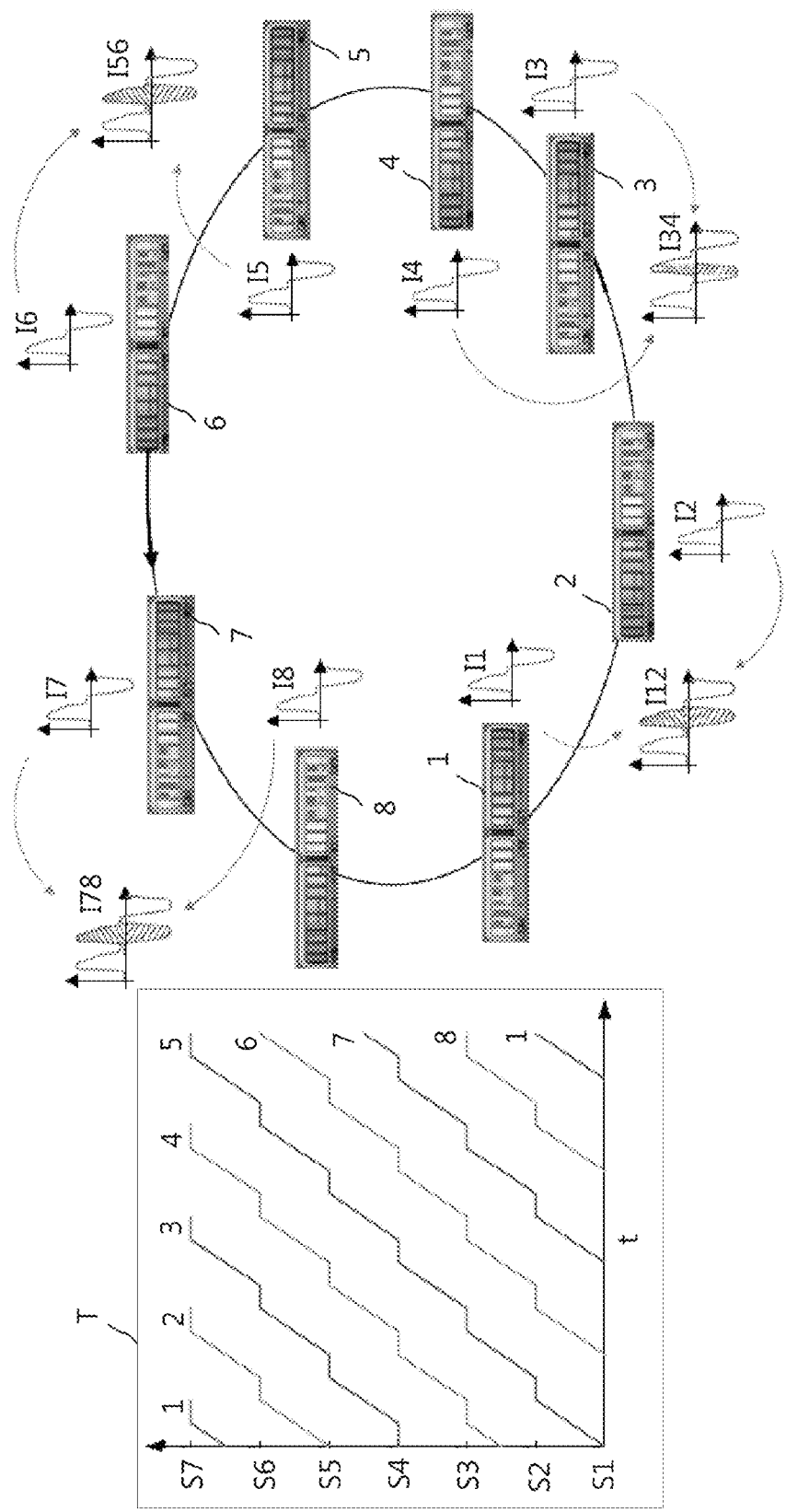

FIG. 3 presents a first basic timetable T to define running orders for several trains 1, 2, 3, 4, 5, 6, 7, 8 running between seven stations S1, S2, S3, S4, S5, S6, S7 on a carrousel type route also represented with respective energy profiles I1, I2, I3, I4, I5, I6, I7, I8 for said trains, making phases B and D of pairs of trains coincide (according to FIGS. 1 and 2B). According to their location (as per FIG. 1 or 2B again), the implementation of the method according to the invention by cyclic modification of running orders for trains is thus applicable as a function of a principle of proximity of groups of trains. In principle, phases of traction and braking running orders for neighboring groups of trains respect the timetable (here, for example, for pairs of trains 1 and 2, 5 and 6, 7 and 8, whose traction and braking phases are perfectly aligned by initial desynchronization according to the timetable so as to generate ideal energy profiles I12, I56, I78) while other phases such as that of pair of trains 3 and 4 may be cyclically partially/complementarily desynchronized as a priority with respect to the basic timetable so as to match local traffic variations and prevent energy losses. For this pair of trains 3 and 4, the energy profiles I3, I4 are thus adjusted according to the invention in order to achieve a (re-)modified profile I34, presenting a perceptible variation with respect to the ideal profile as would result from the initial timetable for trains 3 and 4. To sum up, local phase adjustments (for example) of running orders are dynamically possible so as to minimize the (absolute) values of the global energy profile of the carrousel (as in FIG. 2B).

The invention claimed is:

1. A method for minimizing an electricity consumption in a public transport network having a plurality of consumers being electric vehicles, the method comprising:
delivering electrical energy from vehicles during braking, the energy to be recovered by consumers on the transport network, the consumers including moving vehicles;
generating a timetable of running orders for all the vehicles in the transport network taking account of at least the following parameters:
a dynamic location of each vehicle;
a stop schedule for each vehicle outside a stop zone; and
a start schedule for each vehicle in a stop zone in the transport network;
depending on time and motion variations in at least one of the parameters, modifying at least some of the running orders in the timetable chronologically according to at least one criterion for a maximum distribution of energy recovered from braking to consumers potentially actively requiring power, wherein the running orders are modified within a reasonable maximum time interval so as to not disturb an imposed minimum traffic frequency and maintain a service to passengers within the reasonable maximum time interval when countering disturbances and unforeseen events, and wherein the running orders are quasi-continuously modified so as to not significantly disturb global traffic of several neighboring vehicles in terms of passenger service and electricity consumption when countering the disturbances and unforeseen events; and
delivering the timetable with the running orders to the vehicles.

2. The method according to claim 1, which comprises producing the timetable of running orders for all the vehicles taking into account at least one of the following additional parameters: a number of vehicles braking, a number of consumers, an instantaneous speed of each vehicle, and any other parameter associated with a safe or degraded moving vehicle operating mode.

3. The method according to claim 1, which comprises distributing the orders in the timetable either by storing the timetable, or the orders thereof, in an onboard vehicle run control module or in real time by transmission of the table, or instantaneously modifiable orders thereof, to all the vehicles.

4. The method according to claim 1, wherein the orders are variable running orders comprising at least one of the following orders: prolonged stop; premature stop; premature start; reduced speed; accelerated speed; acceleration interval, or deceleration interval.

5. The method according to claim 4, wherein the variable running orders "prolonged stop" or "premature start" are variable within the reasonable maximum time interval so as not to disturb an imposed minimum traffic frequency.

6. The method according to claim 5, wherein the reasonable maximum interval is a maximum prolonged stop interval of 10 s.

7. The method according to claim 1, which comprises, on occasion of a variation in a global number of vehicles or a frequency of the transport network, updating the timetable in real time, either within a predefined pattern depending on at least one type of disturbance, or within a dynamic pattern of orders modified and instantaneously distributed to the vehicles.

8. The method according to claim 1, wherein the orders are variable running orders depending on line profile factors and load factors.

9. The method according to claim 1, wherein the line profile factors comprises inclines and viaducts and the load factors include a number of passengers on the transport network.

10. At least one non-transitory computer readable medium storing a set of computer executable instructions for minimizing an electricity consumption in a public transport network having a plurality of consumers being electric vehicles, the vehicles, upon braking, delivering electrical energy to be recovered by consumers on the transport network, the consumers including moving vehicles, the computer executable instructions configured for:
generating a timetable of running orders for all the vehicles in the transport network taking account of at least the following parameters:
a dynamic location of each vehicle;
a stop schedule for each vehicle outside a stop zone; and
a start schedule for each vehicle in a stop zone in the transport network;
storing the timetable in a memory support, the timetable including at least one running order of one or more vehicles to be executed instantaneously by each of the vehicles in the transport network;
depending on time and motion variations in at least one of the parameters, modifying at least some of the running orders in the timetable chronologically according to at least one criterion for a maximum distribution of energy recovered from braking to consumers potentially actively requiring power, wherein the running orders are modified within a reasonable maximum time interval so as to not disturb an imposed minimum traffic frequency and maintain a service to passengers within the reasonable maximum time interval when countering disturbances and unforeseen events, and wherein the running orders are quasi-continuously modified so as to not significantly disturb global traffic of several neighboring vehicles in terms of passenger service and electricity consumption when countering the disturbances and unforeseen events; and delivering the timetable with the running orders to the vehicles.

11. The non-transitory computer readable medium according to claim 10, wherein the at least one non-transitory computer readable medium includes a non-transitory computer readable medium located in a central control position for global traffic in the transport network, said part being interconnectable with vehicle running order execution modules.

12. The non-transitory computer readable medium according to claim 10, wherein the at least one non-transitory computer readable medium includes a non-transitory computer readable medium located on board a vehicle linked to a vehicle running order execution module.

13. The non-transitory computer readable medium according to claim 12, wherein the vehicle running order execution module executes a vehicle running program respecting a minimum electricity consumption constraint.

* * * * *